US009817249B2

(12) United States Patent
Doerr

(10) Patent No.: US 9,817,249 B2
(45) Date of Patent: Nov. 14, 2017

(54) ALTERNATING TRAVELING-WAVE MACH-ZEHNDER MODULATOR

(71) Applicant: ACACIA COMMUNICATIONS INC., Maynard, MA (US)

(72) Inventor: Christopher Doerr, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 1047 days.

(21) Appl. No.: 13/928,043

(22) Filed: Jun. 26, 2013

(65) Prior Publication Data

US 2013/0343693 A1 Dec. 26, 2013

Related U.S. Application Data

(60) Provisional application No. 61/664,618, filed on Jun. 26, 2012.

(51) Int. Cl.
  *G02F 1/225* (2006.01)
  *G02F 1/01* (2006.01)

(52) U.S. Cl.
  CPC ............ *G02F 1/011* (2013.01); *G02F 1/2255* (2013.01); *G02F 1/2257* (2013.01); *G02F 2201/126* (2013.01); *G02F 2201/127* (2013.01)

(58) Field of Classification Search
  None
  See application file for complete search history.

(56) References Cited

U.S. PATENT DOCUMENTS

| | | | | |
|---|---|---|---|---|
| 5,074,631 A * | 12/1991 | Hamano | ............... | G02F 1/0327 385/3 |
| 5,137,357 A * | 8/1992 | Ferrar | .................. | G01C 19/726 356/464 |
| 5,157,744 A * | 10/1992 | Korotky | ............... | G02F 1/0327 385/132 |
| 5,359,449 A * | 10/1994 | Nishimoto | ............ | G02F 1/0123 359/245 |
| 7,277,603 B1 * | 10/2007 | Roberts | ................. | G02F 1/0121 385/1 |
| 2002/0071622 A1 * | 6/2002 | Betts | ..................... | G02F 1/2257 385/2 |
| 2004/0016920 A1 * | 1/2004 | Akiyama | .............. | G02F 1/2257 257/14 |
| 2005/0036791 A1 * | 2/2005 | Gunn, III | ................ | G02F 1/025 398/183 |
| 2008/0089634 A1 * | 4/2008 | Mosinskis | ............. | G02F 1/0121 385/3 |
| 2011/0044573 A1 * | 2/2011 | Webster | ................ | G02F 1/0121 385/3 |

(Continued)

OTHER PUBLICATIONS

Cui et al., Modeling and Design of GaAs Traveling-Wave Electrooptic Modulators Based on Capacitively Loaded Coplanar Strips. J Lightwave Tech. Jan. 2006;24(1):544-54.

*Primary Examiner* — Mike Stahl
(74) *Attorney, Agent, or Firm* — Wolf, Greenfield & Sacks, P.C.

(57) ABSTRACT

Disclosed herein is a traveling-wave Mach-Zehnder modulator and method of operating same that advantageously exhibits a reduced optical insertion loss as compared with contemporary Mach-Zehnder structures. Such advantage comes at the modest expense of increased modulator length and increased RF loss.

10 Claims, 2 Drawing Sheets

(56) References Cited

U.S. PATENT DOCUMENTS

| | | | |
|---|---|---|---|
| 2012/0230626 A1* | 9/2012 | Metz | G02F 1/011 385/3 |
| 2013/0272700 A1* | 10/2013 | Satoh | H04B 10/50 398/45 |
| 2014/0112611 A1* | 4/2014 | Vermeulen | G02F 1/2257 385/3 |
| 2015/0043866 A1* | 2/2015 | Chen | G02F 1/2255 385/3 |

* cited by examiner

ALTERNATING TRAVELING-WAVE MACH-ZEHNDER MODULATOR

CROSS REFERENCE TO RELATED APPLICATIONS

This application claims the benefit of U.S. Provisional Patent Application Ser. No. 61/664,618 filed Jun. 26, 2012 which is incorporated by reference in its entirety as if set forth at length herein.

TECHNICAL FIELD

This disclosure relates generally to the field of optical communications and in particular to a traveling-wave Mach-Zehnder modulator.

BACKGROUND

Contemporary optical communications and other systems oftentimes make extensive use of Mach-Zehnder modulators. Given their importance, improved Mach-Zehnder structures would represent a welcome addition to the art.

SUMMARY

An advance in the art is made according to an aspect of the present disclosure directed to a traveling-wave Mach-Zehnder modulator that advantageously exhibits a reduced optical insertion loss as compared with contemporary Mach-Zehnder structures. Such advantage comes at the modest expense of increased modulator length and increased RF loss.

Operationally, and according to an aspect of the present disclosure, a full voltage of a differential line is applied across one diode at a time thereby driving the two arms of the Mach-Zehnder modulator alternately—in sharp contrast to the prior art which drives the two arms simultaneously.

Advantageously, such operation according to the present disclosure reduces the overall optical insertion loss due to the active region(s) by a factor of two in dB. Such advantage comes at modest cost namely, the modulator according to the present disclosure will be approximately twice as long if the same capacitance per unit length is desired, and the total RF loss at the end of a transmission line is higher due to the higher total capacitance.

BRIEF DESCRIPTION OF THE DRAWING

A more complete understanding of the present disclosure may be realized by reference to the accompanying drawings in which.

DETAILED DESCRIPTION

Figure 1:
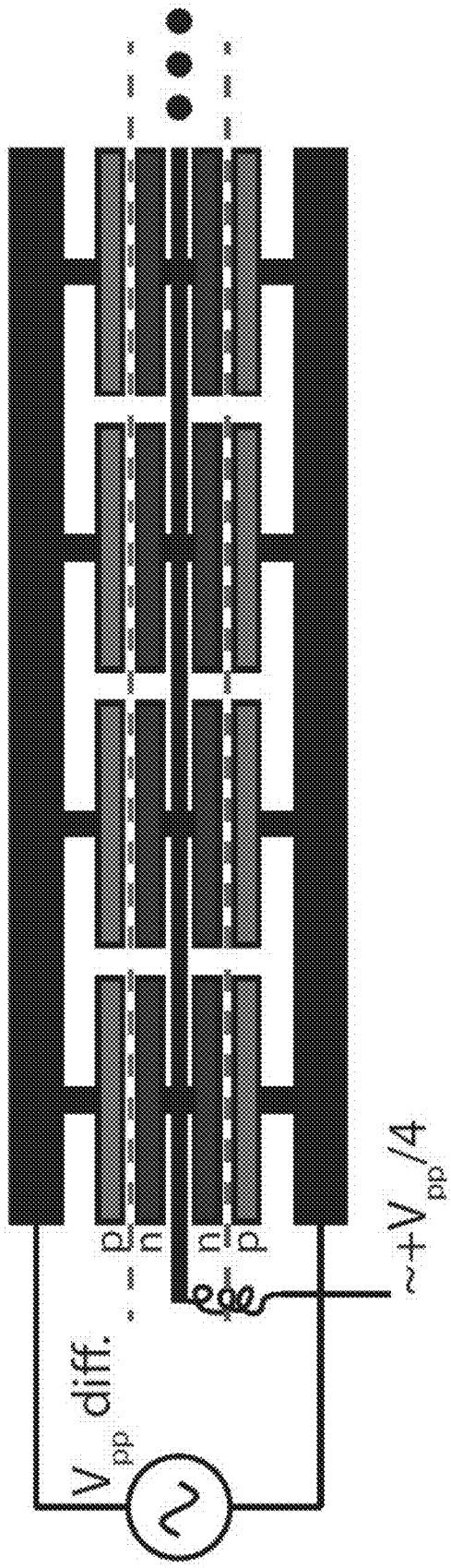
FIG. 1 shows a schematic of a prior art Mach-Zehnder modulator wherein optical waveguides are represented by dotted lines.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, it is noted that differentially driven traveling-wave Mach-Zehnder modulators (MZMs) have proven to be quite useful for creating advanced modulation formats with high fidelity and low driver power. Such modulators have particularly proven their utility in InP photonics, Si photonics and other electro-optic material systems.

A representative prior-art design of a traveling-wave Mach-Zehnder modulator is shown schematically in FIG. 1 wherein dotted lines represent optical waveguides. As may be observed from that Figure, the prior art modulator comprises a main RF coplanar strip waveguide with capacitive loading. (See., e.g., Y. Cui, "Modeling and Design of GaAs traveling-wave electrooptic modulators based on capacitively loaded coplanar strips" Journal of Lightwave Technology, vol. 24, no. 1, pp. 544-554, 2006) the entire contents of which are hereby incorporated by reference in its entirety. With such structures, two arms of the MZM are differentially driven with structures that connect to a main line. The modulator(s), such as InP or Si modulators, are constructed as diodes. Two diodes associated with the two MZM arms are connected in series. One known advantage of this design is that it is simple and the capacitance is low due—in part—to having the two diodes connected in series. One disadvantage of such an arrangement is that the voltage is reduced by a factor of two across each diode because of the series arrangement. Consequently, an active region of such modulators must be long in order to achieve a desired phase shift. Of further disadvantage, the active region of such modulators typically exhibit a high optical loss.

According to an aspect of the present disclosure, an advance is made in the art by applying the full voltage of the differential line across one diode at a time—thereby driving the two arms alternately rather than simultaneously as done in the prior art.

Figure 2:
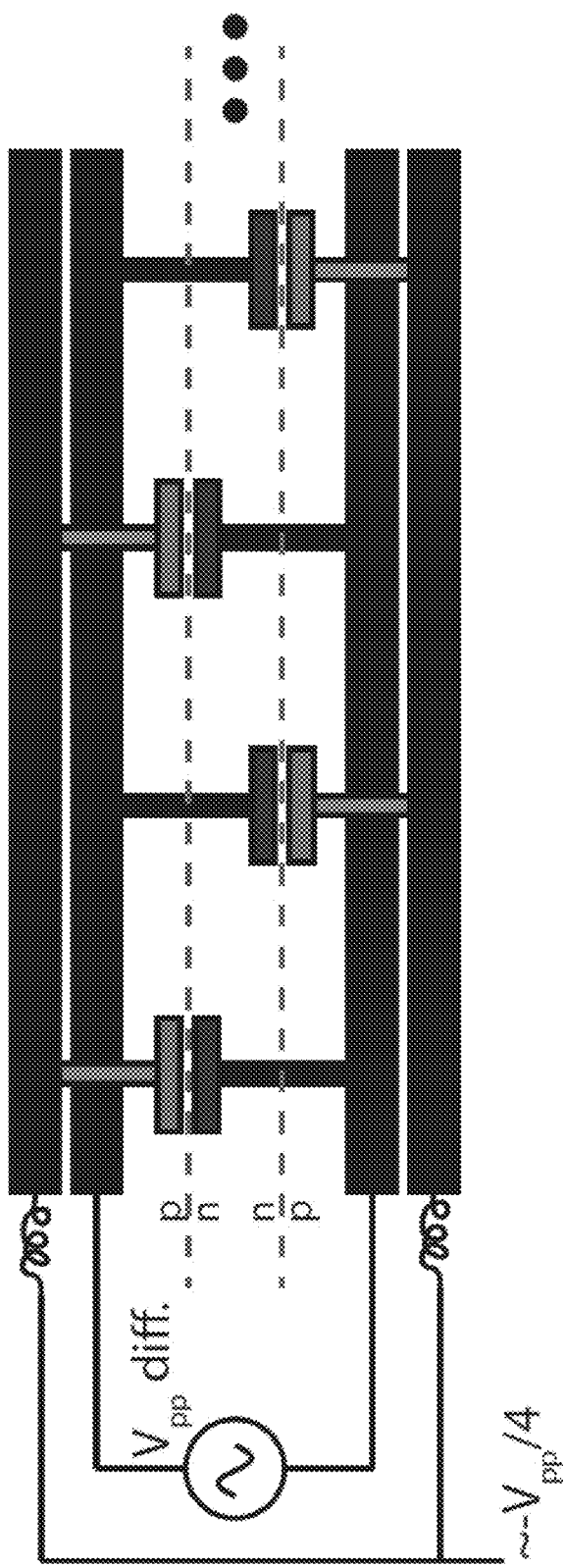
FIG. 2 shows a schematic of a traveling-wave Mach-Zehnder modulator according to an aspect of the present disclosure wherein optical waveguides are represented by dotted lines.

As noted previously, such advance comes at a modest cost namely, a modulator according to the present disclosure will be approximately twice as long if the same capacitance per unit length is desired, and the total RF loss at the end of a transmission line is higher due to the higher total capacitance Turning now to FIG. 2, there it shows a traveling-wave Mach-Zehnder modulator in schematic form according to an aspect of the present disclosure. As shown, a coplanar microstrip includes—in addition to two main lines—two auxiliary lines that exhibit a different DC level than the two main lines for biasing the diodes. These extra—auxiliary—lines are connected to the main lines with a high capacitance. As may be appreciated, the auxiliary lines may be placed laterally or vertically relative to the main lines.

According to an aspect of the present disclosure, because the capacitance in the active regions is effectively doubled, if one needs a same average capacitance per unit length as prior art designs, then loading of the line by the active section must be reduced by a factor of two.

As may be appreciated if the capacitance per unit length and $V_\pi L$ of each diode are $c_0$ and $V_\pi L$, respectively, then the total modulator length for the prior art design required for full binary phase-shift keying (BPSK) is defined by:

$$L = \frac{c_0 V_{\pi L}}{c_d V_{pp}};$$

where $c_d$ is the desired capacitance per unit length, and $V_{pp}$ is the differential peak-to-peak drive voltage. For designs according to the present disclosure:

$$L = \frac{2c_0 V_{\pi L}}{c_d V_{pp}};$$

Thus, designs according the present disclosure will be twice as long as prior art designs.

Furthermore, if the optical loss in dB per unit length of the active regions is $\alpha$ then the total loss of prior art designs may be represented by:

$$loss = \frac{2V_{\pi L}}{V_{pp}} \alpha;$$

whereas for alternating designs according to the present disclosure it is represented by:

$$loss = \frac{V_{\pi L}}{V_{pp}} \alpha$$

As may be observed by these relationships, the loss is reduced by a factor of two in designs according to the present disclosure.

If however, the RF loss is dominated by series resistance in the connections to the diodes, then designs according to the present disclosure will exhibit twice the RF loss at the end of a modulator because the total capacitance is twice as large.

Accordingly, alternating designs according to the present disclosure decrease the optical loss significantly however increase the total capacitance. This increased capacitance results in a longer modulator and increased RF loss. Consequently, alternating designs according to the present disclosure may be particularly well suited for lower speed operation, where such issues present less concern. Additionally, such designs may be particularly useful in a resonant modulator, in which a low optical loss is important.

Those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A method of driving a Mach-Zehnder modulator comprising:
   driving a first pn-junction of a first pair of pn-junctions and a first pn-junction of a second pair of pn-junctions with a first alternating current (AC) signal; and
   driving a second pn-junction of the first pair of pn-junctions and a second pn-junction of the second pair of pn-junctions with a second alternating current (AC) signal;
   wherein the first pn-junction of the first pair of pn-junctions and the first pn-junction of the second pair of pn-junctions are disposed in a first waveguide arm of the Mach-Zehnder modulator, and the second pn-junction of the first pair of pn-junctions and the second pn-junction of the second pair of pn-junctions are disposed in a second waveguide arm of the Mach-Zehnder modulator; and
   wherein the first pn-junction of the first pair of pn-junctions and the second pn-junction of the first pair of pn-junctions are offset with respect to each other along a direction from an input to an output of the Mach-Zehnder modulator, and wherein the first and second pn-junctions of the first pair of pn-junctions share an equal order of appearance of pn-junctions in the first waveguide arm and the second waveguide arm, respectively, along the direction from the input to the output.

2. A Mach-Zehnder modulator comprising:
   an input;
   an output;
   a first waveguide arm optically connected between the input and the output;
   a second waveguide arm optically connected between the input and the output;
   a first pair of pn-junctions, a first pn-junction of the first pair of pn-junctions being disposed in the first waveguide arm and a second pn-junction of the first pair of pn-junctions being disposed in the second waveguide arm; and a second pair of pn-junctions, a first pn-junction of the second pair of pn-junctions being disposed in the first waveguide arm and a second pn-junction of the second pair of pn-junctions being disposed in the second waveguide arm;

wherein the first pn-junction of the first pair of pn-junctions and the second pn-junction of the first pair of pn-junctions are offset with respect to each other along a direction from the input to the output, and wherein the first and second pn-junctions of the first pair of pn-junctions share an equal order of appearance of pn-junctions in the first waveguide arm and the second waveguide arm, respectively, along the direction from the input to the output.

3. The Mach-Zehnder modulator of claim 2, wherein the first pair of pn-junctions is nearer than the second pair of pn-junctions to the input.

4. The Mach-Zehnder modulator of claim 2, wherein the first waveguide arm lacks pn-junctions between the first pn-junction of the first pair of pn-junctions and the input, and wherein the second waveguide arm lacks pn-junctions between the second pn-junction of the first pair of pn-junctions and the input.

5. The Mach-Zehnder modulator of claim 2, wherein the first pn-junction of the first pair of pn-junctions and the first pn-junction of the second pair of pn-junctions are electrically connected to a first transmission line, and wherein the second pn-junction of the first pair of pn-junctions and the second pn-junction of the second pair of pn-junctions are electrically connected to a second transmission line.

6. The Mach-Zehnder modulator of claim 5, wherein the first transmission line comprises a first electrode and a second electrode, and the second transmission line comprises a third electrode separate from the first electrode and the second electrode, and a fourth electrode separate from the first electrode and the second electrode.

7. The Mach-Zehnder modulator of claim 5, wherein the first transmission line is configured to receive a first direct current (DC) bias voltage and the second transmission line is configured to receive a second DC bias voltage different from the first DC bias voltage.

8. The method of claim 1, further comprising biasing the first pn-junction of the first pair of pn-junctions and the first pn-junction of the second pair of pn-junctions with a first DC voltage and biasing the second pn-junction of the first pair of pn-junctions and the second pn-junction of the second pair of pn-junctions with a second DC voltage.

9. The method of claim 1, wherein the first AC signal is derived from the second AC signal.

10. The Mach-Zehnder modulator of claim 2, wherein the first waveguide arm and the second waveguide arm comprise an equal number of pn-junctions that are disposed between, respectively, the first pn-junction of the first pair of pn-junctions and the input, and the second pn-junction of the first pair of pn-junctions and the input.

* * * * *